(12) United States Patent
Okuno et al.

(10) Patent No.: US 10,797,323 B2
(45) Date of Patent: Oct. 6, 2020

(54) CURRENT COLLECTOR FOR FUEL CELL, AND FUEL CELL

(71) Applicants: Sumitomo Electric Industries, Ltd., Osaka-shi, Osaka (JP); NATIONAL INSTITUTE OF ADVANCED INDUSTRIAL SCIENCE AND TECHNOLOGY, Tokyo (JP)

(72) Inventors: Kazuki Okuno, Itami (JP); Takahiro Higashino, Itami (JP); Masatoshi Majima, Itami (JP); Tsutomu Iwaki, Ikeda (JP); Masahiro Yanagida, Ikeda (JP); Tetsuo Sakai, Ikeda (JP)

(73) Assignees: Sumitomo Electric Industries, Ltd., Osaka-shi, Osaka (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 313 days.

(21) Appl. No.: 15/127,860

(22) PCT Filed: Mar. 19, 2015

(86) PCT No.: PCT/JP2015/058202
§ 371 (c)(1),
(2) Date: Sep. 21, 2016

(87) PCT Pub. No.: WO2015/151828
PCT Pub. Date: Oct. 8, 2015

(65) Prior Publication Data
US 2017/0117557 A1    Apr. 27, 2017

(30) Foreign Application Priority Data
Mar. 31, 2014    (JP) ................................ 2014-072355

(51) Int. Cl.
*H01M 8/02* (2016.01)
*H01M 8/0245* (2016.01)
(Continued)

(52) U.S. Cl.
CPC ....... *H01M 8/0245* (2013.01); *H01M 8/0232* (2013.01); *H01M 8/0234* (2013.01); *H01M 8/0239* (2013.01); *H01M 2008/1095* (2013.01)

(58) Field of Classification Search
CPC ............. H01M 8/0245; H01M 8/0232; H01M 8/0234; H01M 8/0239; H01M 2008/1095
See application file for complete search history.

(56) References Cited

U.S. PATENT DOCUMENTS

2007/0062821 A1    3/2007    Sato et al.
2007/0099068 A1    5/2007    Suzuki et al.
(Continued)

FOREIGN PATENT DOCUMENTS

JP    H06-5289 A    1/1994
JP    2000-058072    *    2/2000    .............. H01M 8/02
(Continued)

OTHER PUBLICATIONS

Machine translation of JP 2004-071456, retrieved from <https://worldwide.espacenet.com/?locale=en_EP> on Jan. 26, 2018.*
(Continued)

*Primary Examiner* — Cynthia K Walls
(74) *Attorney, Agent, or Firm* — Faegre Drinker Biddle & Reath LLP

(57) ABSTRACT

A current collector included in a fuel cell, the fuel cell including a membrane electrode assembly including a solid polymer electrolyte layer and a pair of electrode layers formed to sandwich the solid polymer electrolyte layer, the current collector stacked on each electrode layer, and a gas flow path for supply of a gas to each electrode layer, the (Continued)

current collector including a metal porous body which is stacked on the electrode layer, has a flowing gas supplied to the electrode layer, and is rendered conducting to the electrode layer, and the metal porous body including an electrically conductive layer containing electrically conductive particles fixed to a corrosion-resistant and water-repellent resin at least on a side of the electrode layer.

8 Claims, 10 Drawing Sheets

(51) Int. Cl.
    *H01M 8/0232* (2016.01)
    *H01M 8/0234* (2016.01)
    *H01M 8/0239* (2016.01)
    *H01M 8/1018* (2016.01)

(56) References Cited

U.S. PATENT DOCUMENTS

| | | |
|---|---|---|
| 2007/0264550 A1 | 11/2007 | Zhang et al. |
| 2009/0111001 A1 | 4/2009 | Otake |
| 2010/0009241 A1 | 1/2010 | Sato et al. |
| 2010/0190084 A1 | 7/2010 | Shizuku et al. |
| 2013/0108947 A1 | 5/2013 | Okuno et al. |
| 2013/0266862 A1 | 10/2013 | Okuno et al. |
| 2013/0295459 A1 | 11/2013 | Nishimura et al. |
| 2013/0330649 A1 | 12/2013 | Takane et al. |

FOREIGN PATENT DOCUMENTS

| | | | | |
|---|---|---|---|---|
| JP | 2000-058072 A | | 2/2000 | |
| JP | 2004-071456 | * | 3/2004 | ............ H01M 8/02 |
| JP | 2004-146265 A | | 5/2004 | |
| JP | 2006-059661 A | | 3/2006 | |
| JP | 2006-164947 A | | 6/2006 | |
| JP | 2007-035437 A | | 2/2007 | |
| JP | 2007-066750 A | | 3/2007 | |
| JP | 2007-149357 A | | 6/2007 | |
| JP | 2010-067453 A | | 3/2010 | |
| JP | 2010-146765 A | | 7/2010 | |
| JP | 2011-129265 A | | 6/2011 | |
| JP | 2012-079621 A | | 4/2012 | |
| JP | 2012-132083 A | | 7/2012 | |
| JP | 2012-149282 A | | 8/2012 | |
| JP | 2013-093271 A | | 5/2013 | |

OTHER PUBLICATIONS

Machine translation of JP 2000-058072, retrieved from <https://worldwide.espacenet.com/?locale=en_EP> on Jan. 26, 2018.*
Cmposition of SUS 304, retrieved from <http://www.yamco-yamashin.com/en/products/guide_stainless_steel.html> on Jan. 26, 2018.*

* cited by examiner

CURRENT COLLECTOR FOR FUEL CELL, AND FUEL CELL

TECHNICAL FIELD

The invention of the present application relates to a current collector suitable for a polymer electrolyte fuel cell including a solid polymer electrolyte layer formed of a polymer material and to a fuel cell including the current collector.

BACKGROUND ART

A polymer electrolyte fuel cell (PEFC) includes a membrane electrode assembly (MEA) provided with a first electrode layer (an air electrode), on which a gas containing oxygen acts, on one side of a solid polymer electrolyte layer formed from a film of a polymer such as a fluorine resin and provided with a second electrode layer (a fuel electrode), on which a gaseous fuel containing hydrogen acts, on the other side. Since the polymer electrolyte fuel cell operates at a lower temperature than a fuel cell in other forms, it has been put into practical use as a source of energy for a car or a household power supply.

In the polymer electrolyte fuel cell, a gas containing oxygen and normal air act on the first electrode layer. A fuel gas containing hydrogen acts on the second electrode layer so that electric power is generated. Current collectors for extracting electricity are provided as being stacked on the respective first and second electrode layers.

The current collector is electrically connected to each electrode layer and formed of an electrically conductive material such that electrons can be exchanged with each electrode. An operating voltage of a cell (a unit cell) formed from one membrane electrode assembly is not higher than 1 V, and a required output voltage or current is obtained by stacking cells in series or connecting cells in parallel in accordance with required output. Normally, a plurality of cells are stacked with an electrically conductive separator being interposed. When each separator is formed from a carbon plate, a gas flow path in a form of a groove is provided for supply of a gas to each electrode layer.

In a polymer electrolyte fuel cell, an ion exchange membrane containing water as an electrolyte is included and an area in the vicinity of an electrode layer is in a corrosive environment. In particular, an area in the vicinity of a first electrode layer where air flows is highly acidic and corrosive. When a current collector made of a metal such as stainless steel is rendered conducting as being in direct contact with the first electrode layer, the current collector will be corroded. Elution of even a small amount of metal when a metal is employed in a current collector may adversely affect the ion exchange membrane. Therefore, a current collector formed of carbon is often employed. In order to prevent damage to a membrane electrode assembly and to achieve a function as a current collector, a carbon sheet obtained as a carbon porous body by working carbon fibers into a form of a nonwoven fabric is provided to cover each electrode layer. Each electrode layer and a separator are electrically connected to each other with the carbon sheet being interposed, and a gas which flows through a gas flow path provided outside the carbon sheet acts on each electrode as being diffused through cavities in the carbon sheet. When the carbon sheet is wetted with water produced in the electrode layer, gas diffusion performance lowers. Therefore, the carbon sheet has been subjected to a water repellent treatment with a fluorine resin.

CITATION LIST

Patent Document

PTD 1: Japanese Patent Laying-Open No. 2011-129265
PTD 2: Japanese Patent Laying-Open No. 2010-067453
PTD 3: Japanese Patent Laying-Open No. 2012-132083
PTD 4: Japanese Patent Laying-Open No. 2012-149282
PTD 5: Japanese Patent Laying-Open No. 2007-035437
PTD 6: Japanese Patent Laying-Open No. 2007-149357

SUMMARY OF INVENTION

Technical Problem

A carbon material for forming a carbon sheet or a separator made of carbon is excellent in resistance to chemical attack, however, it is poorer in electrical conductivity than metals. Carbon is higher in electrical resistance than general metals by one to three order(s) of magnitude. With all constituent members of a fuel cell, that is, carbon sheets or separators made of carbon with grooves, a discharge voltage lowers and efficiency of a fuel cell cannot be enhanced.

Furthermore, a carbon material is lower in strength than a metal material. Therefore, when a carbon sheet having required strength is adopted, a porosity is low and hence a gas permeability is also low. Since a porosity or a pore diameter is not uniform, a gas cannot uniformly be supplied over the entire surface of an electrode layer and cannot uniformly act thereon, which leads to failure in sufficient exhibition of performance of each electrode layer.

When grooves for supply and exhaust of a gas are formed in a separator, for uniform supply of a gas to an electrode layer, preferably, the groove has a small width and a large depth, a ratio of grooves per unit area is high, and a ratio of grooves in a surface of the separator is high. With a higher ratio of formation of grooves, however, an area of contact with the carbon sheet lowers. Then, a contact resistance is higher, electrical conductivity lowers, and efficiency of a fuel cell lowers. When grooves are formed in a separator with high precision, a process becomes complicated and manufacturing cost increases.

Furthermore, due to application of a pressure in integration of a separator and a membrane electrode assembly, the separator provided with grooves enters the carbon sheet and the grooves become shallow. Such deformation of the carbon sheet may block supply of a gas. When air is used as a source of supply of oxygen, a nitrogen component which remains after consumption of oxygen is preferably quickly removed from a reaction portion, and hence exhaust and removal of a gas in addition to supply thereof to an electrode is also important. Therefore, the above is a problem also in ensuring a path for exhaust of a gas.

An object of the invention of the present application is to provide a current collector which is highly electrically conductive, can ensure required corrosion resistance, and can allow uniform supply of a gas to an electrode layer.

Solution to Problem

The invention of the present application is directed to a current collector for a fuel cell, the fuel cell including a membrane electrode assembly including a solid polymer electrolyte layer and a pair of electrode layers formed to sandwich the solid polymer electrolyte layer, a current collector stacked on each electrode layer, and a gas flow path for supply of a gas to each electrode layer, the current collector including a metal porous body which is stacked on the electrode layer, has a flowing gas supplied to the electrode layer, and is rendered conducting to the electrode layer, and the metal porous body including an electrically conductive layer containing electrically conductive particles fixed to a corrosion-resistant and water-repellent resin, at least on a side of the electrode layer.

Advantageous Effects of Invention

A current collector formed from a metal porous body can reliably be rendered conducting to an electrode layer and corrosion of the metal porous body in the vicinity of the electrode layer can effectively be prevented.

DESCRIPTION OF EMBODIMENTS

Figure 1:
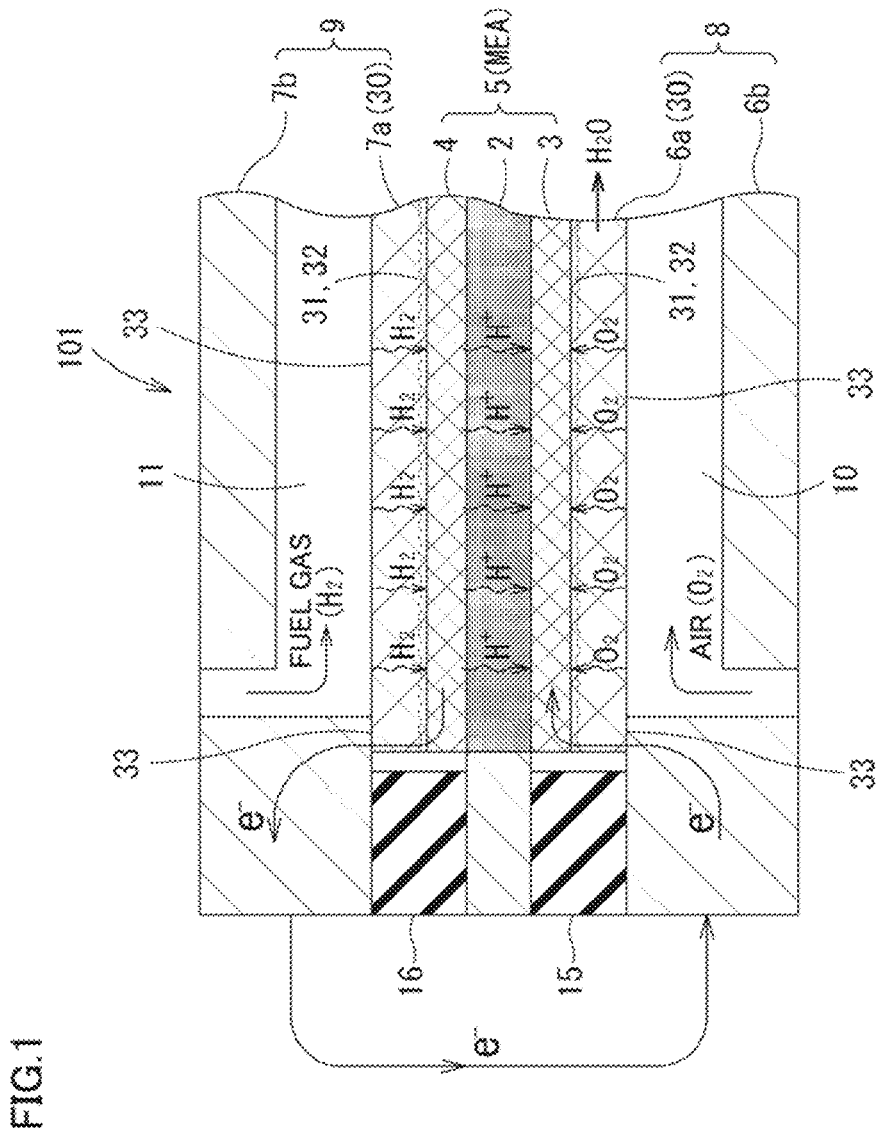
FIG. 1 is a cross-sectional view showing overview of a polymer electrolyte fuel cell to which a current collector according to the invention of the present application is applied.

[Overview of Embodiment of Invention of Present Application]

A fuel cell to which a current collector according to the present embodiment is applied includes a membrane electrode assembly including a solid polymer electrolyte layer and a pair of electrode layers formed to sandwich the solid polymer electrolyte layer, a current collector stacked on each electrode layer, and a gas flow path for supply of a gas to each electrode layer, the current collector includes a metal porous body which is stacked on the electrode layer, has a flowing gas supplied to the electrode layer, and is rendered conducting to the electrode layer, and the metal porous body includes an electrically conductive layer containing electrically conductive particles fixed to a corrosion-resistant and water-repellent resin, at least on a side of the electrode layer.

By providing the electrically conductive layer, direct contact of the metal porous body with the electrode layer is avoided. Therefore, corrosion of the metal porous body in the vicinity of the electrode layer can effectively be prevented. Therefore, a fuel cell can be obtained without using a conventional carbon sheet, and electrical conductivity between the electrode layer and the current collector can be enhanced. Since the electrode layer and the metal porous body are rendered conducting through electrically conductive particles, sufficient electrical conductivity can be ensured without direct contact between the metal porous body and the electrode layer.

Various corrosion-resistant resins can be adopted as the corrosion-resistant and water-repellent resin. For example, a fluorine resin can be adopted. Various fluorine resins and copolymers thereof can be adopted as the fluorine resin. For example, in addition to polytetrafluoroethylene (PTFE), a tetrafluoroethylene-alkyl vinyl ether copolymer, a tetrafluoroethylene-hexafluoropropylene copolymer, polychlorotrifluoroethylene in which a chloro group partly remains, polyvinylidene difluoride (PVdF), or polyvinyl fluoride (PVF) can be adopted. From a point of view of water repellency and price, polytetrafluoroethylene is preferably adopted. A heat treatment for expressing water repellency can be performed at a temperature from 300 to 400° C.

Various corrosion-resistant particles can be adopted as electrically conductive particles. For example, carbon powders or particles of platinum or silver can be adopted.

From an aspect of costs, carbon powders are preferably adopted as the electrically conductive particles. For example, acetylene black, Ketjenblack®, activated carbon, hard carbon, or graphite can be used alone or in combination as carbon powders. From a point of view of preparation of resin slurry in which electrically conductive particles are dispersed or an electrical resistance, preferably, graphite powders are employed alone or as a main material. The electrically conductive particles can have a particle size from 1 to 200 μm and preferably from 5 to 150 μm.

The electrically conductive layer can be formed with various methods. For example, when carbon particles are adopted as electrically conductive particles and the carbon particles are fixed to a surface of a metal porous body with a fluorine resin, a method of applying slurry mainly composed of carbon powders and a fluorine resin dispersion to one surface of the metal porous body can be adopted. For higher binding capability, a polyolefin emulsion or a polyvinyl alcohol aqueous solution can be added to the slurry.

The electrically conductive layer can also be formed densely on a surface of each pore in the metal porous body, or a porous electrically conductive layer can also be formed. The dense electrically conductive layer is in such a form that a gap between electrically conductive particles is filled with a resin. The porous electrically conductive layer is in such a form that adjacent electrically conductive particles are coupled to each other with a resin being interposed. The porous electrically conductive layer can be formed by setting an amount of blended resin to be smaller than an amount sufficient to fill the gaps between electrically conductive particles. For example, when a porous electrically conductive layer is to be formed, a ratio of blending of a resin is preferably set to 3 to 10 weight % with respect to a ratio of blending of electrically conductive particles.

In forming a dense electrically conductive layer, the electrically conductive layer can be formed on a surface of a pore in the metal porous body to a thickness which can ensure a porosity required for flow of a gas. In forming a porous electrically conductive layer, the electrically conductive layer can be formed to bury pores in the metal porous body. For example, the electrically conductive layer can be formed to cover pores in the porous body over the entire surface of the porous body on a side of stack on an electrode layer. In this case, the electrically conductive layer functions as a diffusion layer which has a gas act on a surface of an electrode as being diffused over the surface. Therefore, the electrically conductive layer is formed to be porous such that a porosity allowing a function as a diffusion layer is achieved. By providing the electrically conductive layer functioning as the diffusion layer, a distance between the metal porous body and the surface of the electrode layer can be longer and oxidation of the metal porous body can more effectively be prevented. Since a surface of contact between the surface of the electrode layer and the electrically conductive layer increases, electrical conductivity is enhanced and hence performance of a fuel cell can be enhanced. Since a skeleton of the metal porous body enters the electrically conductive layer, electrical conductivity between the electrically conductive layer and the metal porous body is also improved. When a porous electrically conductive layer is adopted, a porosity allowing a function as a diffusion layer (30 to 50%) is set. The "porosity" here represents a value calculated in an expression below.

Porosity=[1—{weight of porous body÷(volume of porous body×density of material)}]

In a specific method of forming the electrically conductive layer, for example, slurry can be prepared by adding a fluorine resin dispersion and a thickener such as carboxymethylcellulose (CMC) as necessary to graphite powders alone or a powder mixture of graphite with hard carbon and adding a polyethylene emulsion for improvement in binding capability. The slurry is applied to a surface of the metal porous body which comes in contact with the electrode layer. Thereafter, a heat treatment for exhibiting water repellency of the fluorine resin is performed. The heat treatment of the fluorine resin can be performed by heating in air at 350 to 400° C. When a metal porous body formed of a nickel alloy is adopted, for prevention of oxidation, heating in an atmosphere such as a decomposed ammonia gas containing hydrogen is preferred.

A metal porous body which is low in electrical resistivity and formed of a highly corrosion-resistant material is preferably adopted as the metal porous body. For example, nickel or a nickel based alloy is preferably adopted. Specifically, nickel based alloys such as nickel chromium, nickel tin, nickel tungsten, nickel titanium, and nickel cobalt can be adopted.

A form of the metal porous body is not particularly limited. For example, a metal porous body which includes a skeleton including an outer shell and a core portion and includes such a three-dimensional mesh structure that the skeleton is integrally continuous, the core portion being formed of a hollow material, an electrically conductive material, or both of them, is preferably adopted as the metal porous body. A manufacturing method is not particularly limited. For example, the metal porous body can be manufactured by plating a resin foam or a nonwoven fabric made of a resin with nickel, thereafter removing the resin by burning, performing annealing to obtain a nickel porous body, and alloying the obtained nickel porous body with chromium, tin, or tungsten. A nickel porous body or a nickel alloy porous body having a weight per unit area from 300 to 1000 g/m$^2$ is preferably adopted as the nickel porous body or the nickel alloy porous body.

With the metal porous body, a gas flow path which allows a gas to flow in a planar direction of the electrode layer can also be formed. By using the metal porous body as a gas flow path, the gas can uniformly be supplied to the electrode layer. Moisture produced in the vicinity of the electrode layer or a remaining gas can also smoothly be exhausted. The "planar direction" here refers to a direction orthogonal to a direction of thickness of the electrode layer.

By having the metal porous body function as a gas flow path, a dimension of an apparatus as a whole can highly effectively be reduced when a large number of cells are stacked. Since a gas can smoothly be supplied or exhausted, a fuel cell can also be longer in life.

When the metal porous body functions as a gas flow path, a metal porous body having a porosity from 50 to 85% and a pore diameter from 150 to 500 µm is preferably adopted. When the metal porous body has a function as a gas flow path, the metal porous body itself corresponds to conventional grooves provided in a separator. As compared with an example where grooves are provided to occupy 50% of the surface of the separator, a porosity of the metal porous body is higher than a ratio of formation of the grooves and a skeleton portion is smaller in thickness than the grooves. Therefore, the gas flow path can have a small thickness. For example, though conventional grooves provided in the separator had to be as deep as approximately 1000 µm, the metal porous body having a thickness around 500 µm can also function as the conventional carbon sheet and the gas flow path.

When the metal porous body has a porosity exceeding 85%, there is less skeleton and hence an electrical resistance between the electrode layer and the separator increases and improvement in discharge voltage cannot be expected, although the metal porous body is suitable for supply and exhaust of a gas. When a porosity is lower than 50%, flowability of a gas lowers. In order to ensure flowability of a gas, a metal porous body preferably has a pore diameter greater than 150 µm. In order to ensure both of a function as the gas flow path and a function to diffuse the gas to an electrode layer, the pore diameter is preferably set to 500 µm or smaller. The metal porous body can have a high porosity except for its side in contact with a gas diffusion electrode so as to function as a gas flow path.

Similarly to the conventional carbon sheet, the metal porous body can function as a diffusion layer for having a gas act on a surface of an electrode as being diffused over the surface. In this case, preferably, the porosity of the metal porous body (including the electrically conductive layer) in the vicinity of an electrode layer is set to 30 to 50% and the pore diameter is set to 10 to 100 µm. When the porosity is lower than 30%, a flow resistance of the gas is high and a sufficient amount of the gas cannot act on each electrode layer. When the porosity exceeds 50%, a gas diffusion action lowers and the gas cannot uniformly be supplied to the electrode layer. Similarly, when the pore diameter is smaller than 10 µm, a flow resistance of the gas is high and a sufficient amount of the gas cannot act on each electrode layer. When the pore diameter exceeds 100 µm, the gas cannot uniformly be supplied to the electrode layer.

The porosity and the pore diameter of the current collector can be set by adjusting a porosity and a pore diameter of the metal porous body itself or by adjusting a thickness of the electrically conductive layer or a resin layer which will be described later. As described above, the electrically conductive layer can also function as a diffusion layer by providing the electrically conductive layer as burying pores in the metal porous body or as covering pores. In this case, a porosity or a pore diameter of the electrically conductive layer is set as described previously.

One example of a method of forming a metal porous body will be described in detail below. The description below shows exemplary formation of a metal porous body forming a current collector functioning as a gas flow path. Initially, in order for an obtained nickel porous body to have a porosity from 60 to 85%, a resin porous body made of a resin foam or a nonwoven fabric made of a resin substantially the same in porosity is prepared. A required porosity can be set by forming a porous body having a high porosity such as 93 to 96% as adopted in a nickel electrode of a general-purpose alkaline secondary battery and adjusting a thickness with the use of a roller press or the like. Polyurethane is preferred as the resin foam from a point of view of price. A nonwoven fabric made of polyolefin can be adopted as a nonwoven fabric. With a nonwoven fabric obtained by mixing polyethylene fibers and polypropylene fibers and coupling points of intersection of the polypropylene fibers with molten polyethylene by making use of a property of polyethylene low in melting point, a nonwoven fabric having a porosity not lower than 60% can be formed.

In adopting a resin porous body having such a three-dimensional structure, in order to provide electrical conductivity, electroless nickel plating or application of conductive powders such as graphite is performed. Thereafter, through electrolytic plating with nickel, a nickel porous body having a three-dimensional structure is obtained. Then, in order to enhance strength of the porous body, the nickel porous body having a three-dimensional structure is manufactured by burning away the resin foam in an atmosphere containing oxygen and thereafter performing annealing and sintering by heating in an atmosphere containing hydrogen.

A nonwoven fabric plated with nickel is high in mechanical strength than a resin foam. Therefore, the nonwoven fabric can also be used with the nonwoven fabric being left, without the nonwoven fabric being burnt away as with the resin foam. In alloying for obtaining nickel-tin, nickel-chromium, or nickel-tungsten for further improvement in corrosion resistance, a treatment at a temperature exceeding a melting point of a resin is necessary. Therefore, even when a nonwoven fabric is used, a resin should be burnt away as with foamed nickel. In any porous body, a weight per unit area of nickel alone and a nickel alloy is preferably set to 300 to 1000 $g/m^2$ and preferably to 400 to 750 $g/m^2$, in consideration of strength or electrical conductivity. Preferably, a porosity is set to 50 to 85% and a thickness is set to 0.5 to 1 mm.

A resin layer formed of a corrosion-resistant and water-repellent resin can be provided on a part or the entirety of the metal porous body. The corrosion-resistant resin layer can be formed of various corrosion-resistant resins. For example, the resin layer can be formed of a fluorine resin which forms the electrically conductive layer described above.

By forming the resin layer, corrosion resistance of the metal porous body can be ensured. By providing the resin layer, a metal skeleton of the metal porous body can be prevented from entering and damaging the electrode layer or the solid polymer electrolyte layer.

By making the resin layer water repellent, water vapor added to a gas or water generated during electrochemical reaction is prevented from covering a surface of the resin layer or clogging pores, so that characteristics of a fuel cell can be stabilized. In order to make the resin layer water repellent, a water repellent component can be added to a corrosion-resistant resin. With adoption of the fluorine resin, sufficient water repellency can be ensured. The resin layer formed of the fluorine resin can be formed of a fluorine resin dispersion.

Corrosion in the vicinity of the electrode layer can be prevented by forming the resin layer at least on the electrode layer side of the metal porous body. The resin layer can also be formed on the entire metal porous body. In this case, presence of a fluorine resin layer in a portion in contact with a current collection member such as a separator will impair electrical conductivity of this portion. Therefore, connection to the current collection member is preferably achieved by forming a polished surface on a side of the metal porous body opposite to the electrode layer.

When a metal porous body providing a gas flow path has a small pore diameter (100 to 300 μm), a water repellent resin layer is preferably provided on the entire metal porous body in order to ensure flowability of a gas. When a pore diameter is large (300 to 800 μm), a degree of block of a flow of a gas by generated water is low and the water repellent resin layer should be provided only in the vicinity of the electrode layer. When a metal porous body is formed of nickel alone, the resin layer is preferably formed on the entire nickel porous body in order to ensure required corrosion resistance.

By forming a water repellent resin layer on the entire metal porous body, generation of water droplets as blocking a flow of a gas in a gas flow path can be prevented. Since corrosion resistance of a skeleton of the metal porous body is improved, life of a fuel cell can be longer.

When a resin layer is formed on the entire metal porous body, the resin layer can be formed simultaneously with or separately from formation of the electrically conductive layer. For example, a method of impregnating the entire metal porous body with a fluorine resin dispersion, thereafter applying fluorine resin dispersion slurry containing carbon powders to one side of a metal porous body before a heat treatment of the fluorine resin, and thereafter performing a heat treatment can be adopted. In another method, a method of impregnating a metal porous body with a fluorine resin dispersion, performing a heat treatment, thereafter polishing one surface of the metal porous body, applying fluorine resin dispersion slurry containing carbon powders, and performing a heat treatment again can be adopted. By adopting this method, carbon powders and a fluorine resin layer can uniformly be applied.

When a resin layer is formed on a metal porous body other than an area in the vicinity of the electrode layer, a fluorine resin component in the fluorine resin dispersion is preferably set to 2 to 30 weight %.

A polished surface is preferably formed on a surface of the metal porous body opposite to a side in contact with the electrode layer in order to remove a resin layer or an oxide. Thus, electrical contact between the metal porous body and the current collection member such as a separator is improved and discharge characteristics of a fuel cell are improved.

Normally, the electrode layer is formed from a carbon and fluorine resin layer which supports a platinum based catalyst, and integrated with an ion exchange membrane which forms a solid polymer electrolyte layer. In many cases, ion exchange capacity of the ion exchange membrane lowers when it comes in contact with metal ions. In the present embodiment, however, the ion exchange membrane is separated by the electrode layer and the resin layer, so that a probability of the solid polymer electrolyte layer being adversely affected by metal ions is remarkably lowered.

Furthermore, by forming the resin layer on the entire metal porous body, influence on the ion exchange membrane is further lessened.

Unlike a water repellent used for an electrode layer, the resin layer is not involved in electrochemical reaction. Therefore, when a resin layer has a large thickness, an electrical resistance between the electrode layer and a current collection member such as a separator does not increase. Therefore, a degree of elution of a metal in a metal porous body can further be lowered. Since the metal porous body has a smoother surface of a skeleton than a carbon material, the surface of the metal porous body can reliably be covered with the resin layer and the metal porous body can be prevented from being adversely affected by water generated in the vicinity of the electrode layer.

A material having a sulfone group is generally adopted for an ion exchange membrane used for a solid polymer electrolyte layer, and water which is a reaction product may be weakly acidic due to a very small amount of sulfone groups originating from the membrane. In order to address this, preferably, the resin layer is provided and the metal porous body is formed of an alloy such as nickel-tin, nickel-chromium, or nickel-tungsten. The alloy can be obtained by alloying after formation of a nickel porous body.

A fuel cell obtained by stacking a plurality of cells is pressurized in order to integrate the cells. Since the resin layer is provided in the present embodiment, there is no possibility that the metal porous body enters the electrode layer and damages a membrane electrode assembly.

[Details of Embodiment]

An embodiment of a fuel cell including a current collector according to the invention of the present application will be described below with reference to the drawings.

FIG. 1 conceptually shows a structure of a general polymer electrolyte fuel cell 101 to which the current collector according to the present embodiment is attached. The present embodiment is an embodiment where a metal porous body is employed as a gas diffusion sheet instead of a conventional carbon sheet. Though FIG. 1 shows single cell structure, a fuel cell is formed as a plurality of cell structures are stacked in a direction of thickness in order to raise a voltage in electric power generation.

Fuel cell 101 includes a membrane electrode assembly 5 obtained by stacking a first electrode layer 3 as an air electrode and a second electrode 4 as a fuel electrode so as to sandwich a solid polymer electrolyte layer 2. For example, a polymer membrane formed of Nafion® is employed as an ion exchange resin which forms solid polymer electrolyte layer 2.

First electrode layer 3 and second electrode layer 4 are formed by having a catalyst such as a platinum catalyst supported on a support made of carbon or the like in a prescribed region on front and rear sides of solid polymer electrolyte layer 2 and stacking the resultant member in a form of a film with the use of a binder containing the ion exchange resin. In the present embodiment, a member in which approximately 0.5 mg/cm$^2$ of the platinum catalyst is supported on each of first electrode layer 3 and second electrode layer 4 is adopted. First electrode layer 3 and second electrode layer 4 are integrally formed as being stacked in a prescribed region except for an edge portion of solid polymer electrolyte layer 2.

A current collector 8 including a first gas diffusion sheet 6a and a first current collection member 6b is provided on one outer side of membrane electrode assembly 5, and a current collector 9 including a second gas diffusion sheet 7a and a second current collection member 7b is provided on the other outer side. Current collection members 6b and 7b according to the present embodiment are formed of an electrically conductive material such as carbon. By providing grooves in inner surfaces of current collection members 6b and 7b, a first gas flow path 10 and a second gas flow path 11 for allowing a gas to flow are provided.

Gas diffusion sheets 6a and 7a are formed from a metal porous body 30 having electrical conductivity, and constructed to diffuse and supply a gas which flows in gas flow paths 10 and 11 to each of electrode layers 3 and 4. The gas diffusion sheets are constructed to electrically connect electrode layers 3 and 4 to current collection members 6b and 7b for achieving electrical conduction, respectively.

Fuel cell 101 is constructed by stacking gas diffusion sheets 6a and 7a and current collection members 6b and 7b on respective sides of membrane electrode assembly 5 and sealing with gaskets 15 and 16, a peripheral edge portion where electrode layers 3 and 4 are not provided.

Air containing oxygen as an oxidizing agent is introduced in first gas flow path 10 so that oxygen is supplied to first electrode layer 3 through first gas diffusion sheet 6a. A fuel gas containing hydrogen as a fuel is introduced in second gas flow path 11 so that hydrogen is supplied to second electrode layer 4 through second gas diffusion sheet 7a. A product obtained by generation of hydrogen as decomposed by a catalyst provided on second gas diffusion sheet 6a, 7a can also be adopted as a fuel.

For example, in a fuel cell of a proton conductive type, a reaction expressed as $H_2 \rightarrow 2H^+ + 2e^-$ occurs in second electrode layer 4. In first electrode layer 3, a reaction expressed as $1/2 O_2 + 2H^+ + 2e^- \rightarrow H_2O$ occurs. Thus, hydrogen ions move from second electrode layer 4 through solid polymer electrolyte layer 2 to first electrode layer 3, and electrons flow from second electrode layer 4 through second gas diffusion sheet 7a, second current collection member 7b, first current collection member 6b, and first gas diffusion sheet 6a to first electrode layer 3. Electric power is thus obtained. Fuel cell 101 is heated to a prescribed temperature by a not-shown heating apparatus.

Gas diffusion sheets 6a and 7a forming current collectors 8 and 9 are formed from metal porous body 30. Since metal porous body 30 according to the present embodiment is arranged as being in contact with first electrode layer 3 and second electrode layer 4, it is formed of a material having air permeability and corrosion resistance.

A method of manufacturing metal porous body 30 will be described below. Initially, a porous urethane sheet (a commercially available product having a pore diameter from 150 to 500 μm, a thickness of 1.4 mm, and a porosity of 96%) is subjected to an electrically conductive treatment. The electrically conductive treatment can be performed by stacking an electrically conductive material by electroless plating of nickel or by application of carbon particles. A nickel porous body is formed by burning away the urethane sheet subjected to the electrically conductive treatment in atmosphere at 800° C. and thereafter performing a reduction treatment by subjecting the resultant product to a heat treatment at 1000° C. in a reducing atmosphere. With the method, a nickel porous body having a mass per unit area of 400 g/m$^2$, a pore diameter from 150 to 500 μm, and a thickness of 1.4 mm is obtained.

Then, corrosion resistance is provided to the nickel porous body by subjecting the nickel porous body to a chromizing treatment. For example, the nickel porous body is filled with an infiltrant material obtained by mixing chromium powders, a halide, and alumina (90% of chromium, 1% of $NH_4Cl$, and 9% of $Al_2O_3$). The nickel porous body is alloyed by adding chromium to the nickel porous body while it is heated to 800° C. in a reducing atmosphere such as a hydrogen gas. A content of chromium can be adjusted by adjusting a time period for heating, so that a metal porous body composed of a nickel-chromium alloy having required corrosion resistance can be obtained.

For example, an amount of addition of chromium can be set to 10 to 50 weight %. An amount of addition of chromium is set preferably to 3 to 40 weight % and further preferably to 20 to 40 weight %. When an amount of addition of chromium is too small, corrosion resistance lowers. When an amount of addition of chromium is too large, an intermetallic compound is formed between chromium and nickel and strength lowers.

In the present embodiment, a metal porous body formed of a nickel-chromium alloy is adopted for metal porous body 30 to be employed for gas diffusion sheets 6a and 7a. The metal porous body can also be formed of nickel alone, a nickel chromium based alloy, a nickel tin based alloy, or a nickel tungsten based alloy.

Figure 2:
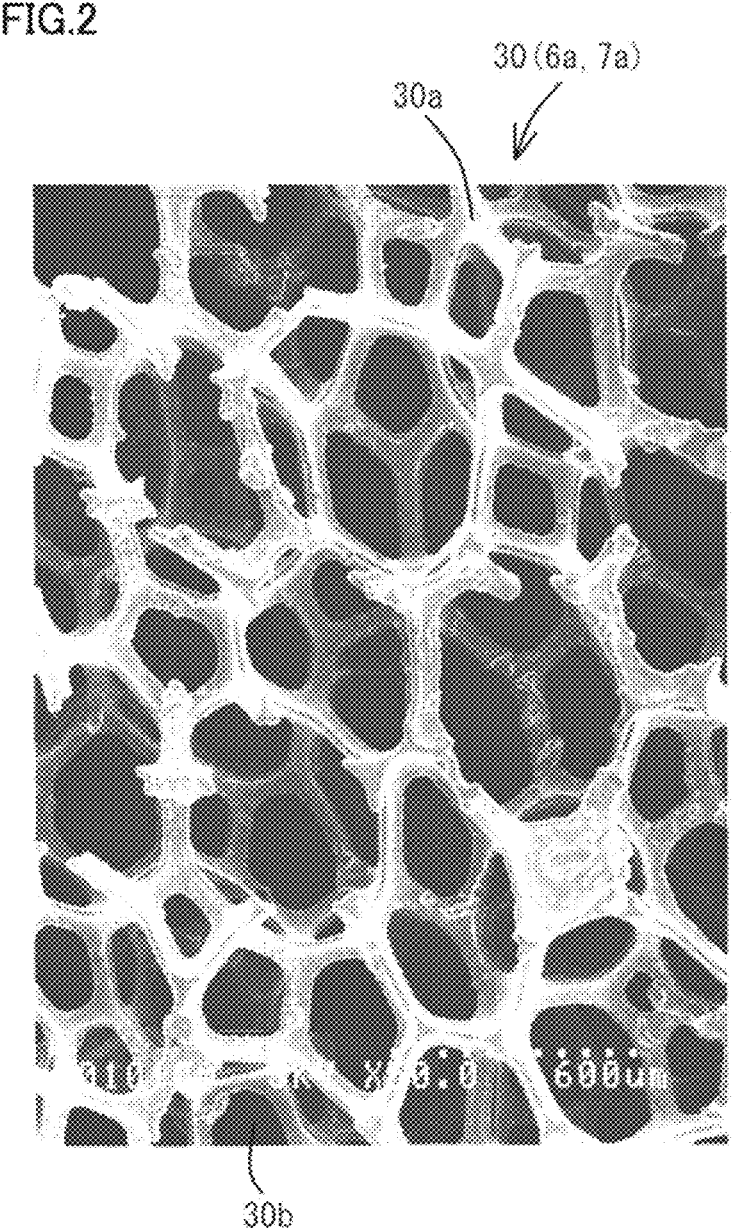
FIG. 2 is a micrograph showing one example of a metal porous body forming the current collector.

As shown in FIG. 2, metal porous body 30 according to the present embodiment includes a skeleton 30a including an outer shell and a core portion and such a three-dimensional mesh structure that skeleton 30a is integrally continuous, the core portion being formed of a hollow material, an electrically conductive material, or both of them. Since metal porous body 30 having such a structure can be formed of a resin porous body, a metal porous body with a required porosity or a required pore diameter can readily be formed. Since the skeleton is formed in a three-dimensional mesh structure, a metal porous body high in porosity can be formed. Since pores 30b can substantially be equal in pore diameter, gas diffusion sheets 6a and 7a which are high in gas diffusibility and can achieve uniform supply of a gas to an electrode layer can be obtained.

Gas diffusion sheets 6a and 7a formed of metal porous body 30 are lower in electrical resistivity than the conventional carbon sheet. Therefore, an electrical resistance between electrode layers 3 and 4 and current collection members 6b and 7b can significantly be lower than in the conventional carbon sheet, and efficiency in electric power generation of fuel cell 101 can be enhanced.

Since metal porous body 30 can be higher in porosity than the conventional carbon sheet, a flow rate of a gas to be supplied to electrode layers 3 and 4 can be increased. Furthermore, since a diameter of pores can be set more uniformly than in the carbon sheet, a gas can uniformly be supplied to an electrode layer. Therefore, efficiency in electric power generation can be enhanced.

Figure 4:
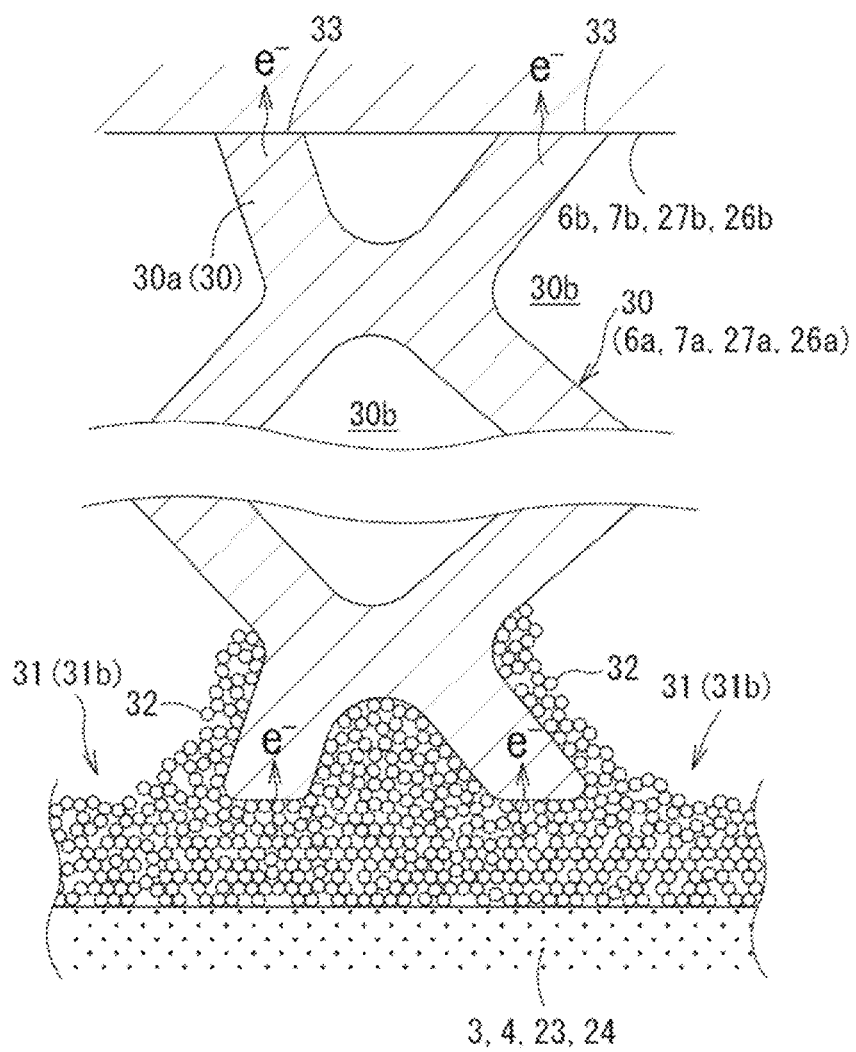
FIG. 4 is an enlarged cross-sectional view schematically showing a structure of a current collector according to Example 1.
Figure 5:
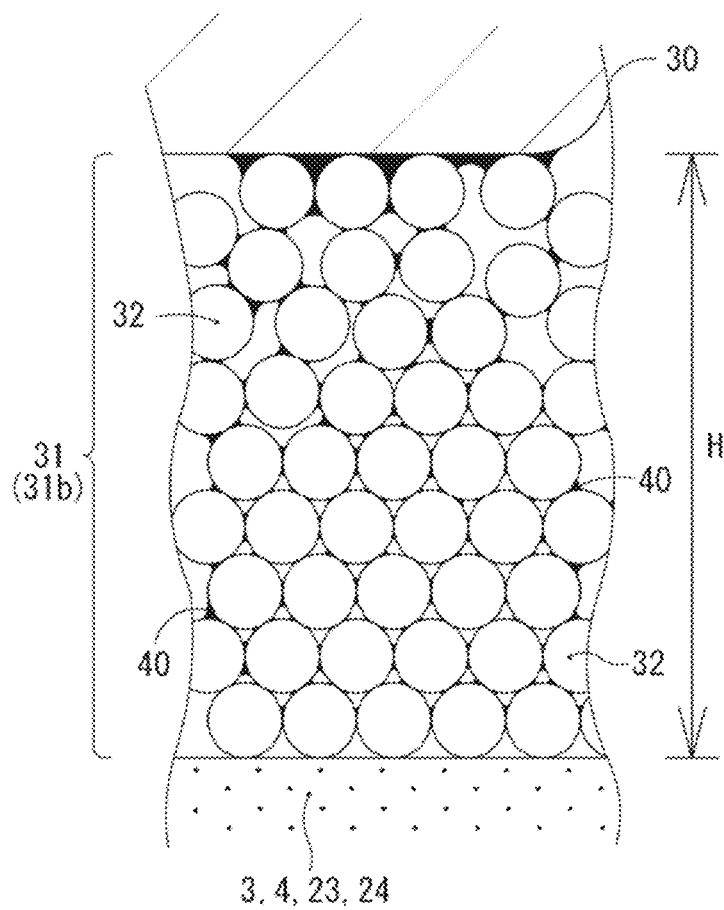
FIG. 5 is an enlarged view of a main portion of the current collector shown in FIG. 4.

In the present embodiment, as shown in FIGS. 4 and 5, an electrically conductive layer 31 containing electrically conductive particles 32 fixed to a corrosion-resistant and water-repellent resin 40 is provided on a surface of metal porous body 30 on a side of stack on electrode layers 3 and 4. As shown in FIG. 5, electrically conductive layer 31 according to the present embodiment is formed to be porous such that electrically conductive particles 32 are continuing as being in contact with one another between the surface of electrode layers 3 and 4 and one surface of metal porous body 30, and resin 40 couples and fixes electrically conductive particles 32. Electrically conductive layer 31 can be formed such that a distance H between one surface of metal porous body 30 and the surface of electrode layers 3 and 4 is set to 100 to 1000 μm.

In the present embodiment, a fluorine resin is adopted as resin 40 and graphite powders are adopted as electrically conductive particles 32. Specifically, fine powders of graphite having a main particle size from 5 to 10 μm are used. Slurry is prepared by adding an aqueous dispersion containing 10 weight % of fluorine resin (PTFE) and containing nickel carbonyl as a thickener to the graphite powders such that the fluorine resin is set to 7 weight % with respect to graphite and adding a non-ionic surfactant to 1 weight % with respect to the entirety for improvement in dispersibility of graphite. The slurry is applied to a surface of metal porous body 30 in contact with an electrode layer. An amount of application is set to 70 g/m². In order to make the added fluorine resin water repellent, metal porous body 30 to which the slurry was applied is subjected to a heat treatment in which it is heated in air at 380° C for 60 minutes. Thus, porous electrically conductive layer 31 having a porosity from 30 to 50% and thickness H from 100 to 1000 μm is formed on one surface of metal porous body 30.

Direct contact between metal porous body 30 and electrode layers 3 and 4 is avoided by providing electrically conductive layer 31. Since metal porous body 30 can be separated from a corrosive environment in the vicinity of electrode layers 3 and 4, corrosion of metal porous body 30 can be prevented.

Since electrode layers 3 and 4 and metal porous body 30 are rendered conducting through graphite powders 32 serving as electrically conductive particles, sufficient electrical conductivity therebetween can be ensured. Since metal porous body 30 is higher in electrical conductivity than the conventional carbon sheet, efficiency of a fuel cell can significantly be improved.

In order to lower a contact resistance between gas diffusion sheets 6a and 7a formed from metal porous body 30 and current collection members 6b and 7b, polished surface 33 is formed in a portion of contact between metal porous body 30 and current collection members 6b and 7b.

Metal porous body 30 can be equal in size of pores and uniform in pore diameter. Therefore, a gas which flows through gas flow paths 10 and 11 can uniformly be supplied to electrode layers 3 and 4.

In the present embodiment, porous electrically conductive layer 31 is formed to cover the surface of metal porous body 30 on the side of the electrode layer and functions as a diffusion layer supplying a gas to electrode layers 3 and 4 as being diffused. Since electrically conductive particles 32 are coupled by a fluorine resin in the present embodiment, electrically conductive layer 31 is water repellent. Therefore, water generated at the surface of electrode layers 3 and 4 is smoothly drained and clogging of pores in electrically conductive layer 31 is less likely. Consequently, performance of a fuel cell can be exhibited in a stable manner.

Figure 10:
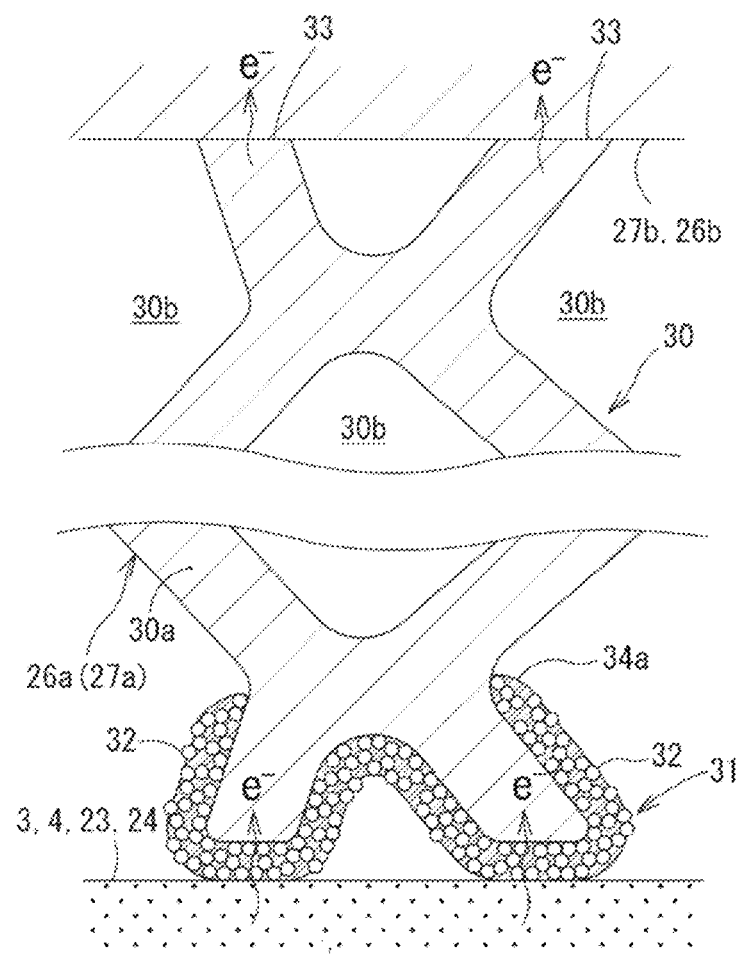
FIG. 10 is an enlarged cross-sectional view schematically showing a structure of a current collector according to Example 3.

FIG. 10 shows an enlarged cross-sectional view of a main portion of a current collector according to a third embodiment.

In the third embodiment, electrically conductive layer 31 having a prescribed thickness is formed on a surface of a pore in the vicinity of one surface of metal porous body 30 where it is stacked on an electrode layer. In electrically conductive layer 31 according to the present embodiment, a corrosion-resistant and water-repellent resin 34a is provided to bury a gap between electrically conductive particles which are continuing as being in contact with one another.

Electrically conductive layer 31 is not formed in such a form as covering one surface of the metal porous body as in the first embodiment, but is formed such that a form of pores in the metal porous body which open on the side of electrode layers 3 and 4 is held.

Metal porous body 30 can be provided at a distance from the surface of electrode layers 3 and 4 also in this embodiment. Since a portion of metal porous body 30 in the vicinity of the electrode layer is covered with a substantially corrosion-resistant and water-repellent resin layer, corrosion of metal porous body 30 can be prevented.

EXAMPLES

A fuel cell according to Example including a current collector formed from a metal porous body and a fuel cell according to Comparative Example including a current collector formed from a conventional carbon sheet were fabricated and they were subjected to a performance test.

[Overview of Apparatus Construction According to Example]

Figure 3:
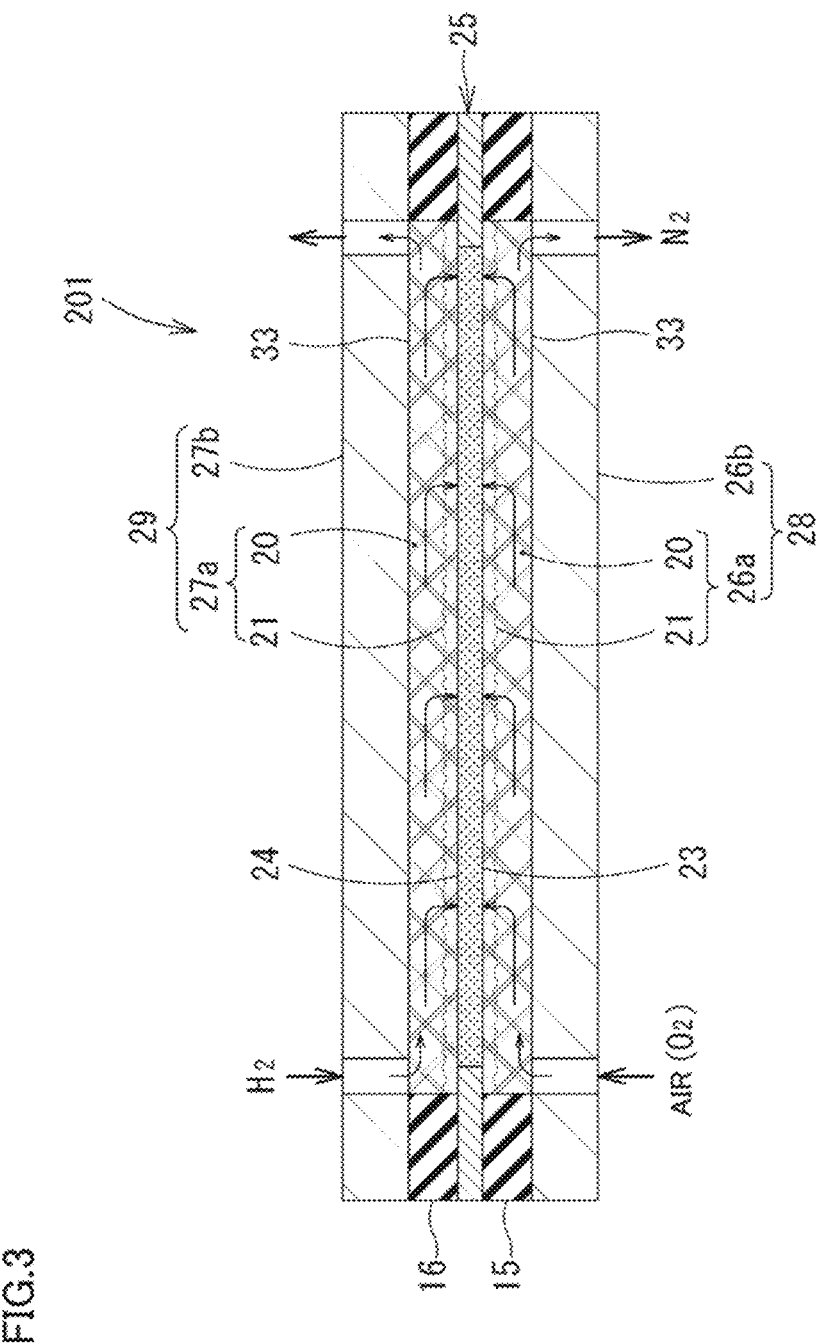
FIG. 3 is a cross-sectional view of a polymer electrolyte fuel cell in another form to which the current collector according to the invention of the present application is applied.

FIG. 3 shows overview of a construction of a fuel cell 201 to which a current collector according to Example is attached. Fuel cell 201 is provided with a first current collector 28 on one side of a membrane electrode assembly 25 and provided with a second current collector 29 as being stacked on the other side. First current collector 28 and second current collector 29 include first and second sheet-shaped porous current collectors 26a and 27a stacked on electrode layers 23 and 24 and a plate-shaped first current collection member (separator) 26b and a second current collection member (separator) 27b stacked on outer sides of first and second sheet-shaped porous current collectors 26a and 27a, respectively. Gaskets 15 and 16 are provided around membrane electrode assembly 25 so as to surround first and second sheet-shaped porous current collectors 26a and 27a. First and second sheet-shaped porous current collectors 26a and 27a according to the present Example each include a gas flow path 20 which allows a gas to flow in a planar direction and a gas diffusion layer 21 which allows a gas to flow to each of electrode layers 23 and 24 as being diffused. FIG. 3 shows electrode layers 23 and 24 with a thickness thereof being omitted. Performance in electric power generation was compared, with sheet-shaped metal porous bodies according to Examples 1 and 2 which will be described below being attached to fuel cell 201 having the construction above and with a gas flowing therein.

Porous Current Collector According to Example 1

(Fabrication of Porous Current Collector According to Example 1)

A foamed nickel-tin alloy was adopted for first sheet-shaped porous current collector 26a and second sheet-shaped porous current collector 27a according to Example 1, and electrically conductive layer 31 to which carbon particles 32 as electrically conductive particles had been fixed was provided to cover a surface of metal porous body 30 in contact with electrode layers 23 and 24 as shown in FIG. 4.

In Example 1, in order to obtain gas flow path 20 excellent in electrical conductivity, a polyurethane sheet having a porosity of 80% was employed as a resin foam for forming metal porous body 30. The polyurethane sheet was cut into a sheet having a thickness of 1.5 mm and the sheet was subjected to electroless nickel plating in order to provide electrical conductivity necessary for nickel electroplating. Specifically, a method of treating a foamed urethane resin sheet with a hydrochloric acid aqueous solution of stannous chloride, thereafter adding a catalyst with a hydrochloric acid aqueous solution of palladium chloride, and immersing the sheet in a nickel sulfate aqueous solution for reduction with sodium hypophosphite to nickel was adopted. A mass per unit area of nickel was set to 8 g/m².

Then, electroplating was performed in a sulfamate bath. Specifically, nickel electroplating was performed by using a bath mainly composed of 450 g/liter of nickel sulfamate, 5 g/liter of nickel chloride, and 30 g/liter of boric acid and feeding a current at 200 mA/cm². A mass per unit area of nickel was set to 300 g/m². Nickel plating was performed with the use of a known sulfamate bath. The urethane resin or the like was burnt away by heating a porous body obtained by plating the resin foam with nickel in air at 750° C. Thereafter, a foamed nickel porous body was manufactured by subjecting the porous body to a heating treatment at 850° C. in a hydrogen atmosphere for reduction and annealing of oxidized nickel. The obtained foamed nickel porous body having a three-dimensional skeleton had a porosity of approximately 80%.

An alloy was formed by adding tin to the metal porous body composed of nickel. Specifically, a sheet-shaped metal porous body composed of a foamed nickel-tin alloy having a content of tin of substantially 30 weight % was fabricated by plating the foamed nickel porous body with tin such that a mass per unit area was 100 g/m² and by diffusing tin through a heat treatment. A bath having a composition of 55 g/liter of stannous sulfate, 100 g/liter of sulfuric acid, 100 g/liter of cresolsulfonic acid, 2 g/liter of gelatin, and 1 g/liter of βnaphthol was employed as a tin plating bath. A current density was set to 10 mA/cm². For alloying by diffusion of tin after plating, the porous body was heated at 550° C. for 10 minutes in a hydrogen atmosphere. Uniform progress of alloying through heating was confirmed.

(Formation of Electrically Conductive Layer)

Electrically conductive layer 31 was formed by fixing carbon particles 32 to a surface in contact with the electrode layer, of metal porous body 30 composed of the foamed nickel-tin alloy, with the use of a fluorine resin. Specifically, fine powders of graphite having a main particle size from 5 to 10 μm were used. Slurry was prepared by adding an aqueous dispersion containing 10 weight % of fluorine resin (PTFE) and containing nickel carbonyl as a thickener to the graphite powders such that the fluorine resin was set to 7 weight % with respect to the graphite powders and adding a non-ionic surfactant to 1 weight % with respect to the entirety for improvement in dispersibility of graphite. The slurry was applied to a surface in contact with each of electrode layers 23 and 24, of the sheet-shaped metal porous body composed of the foamed nickel-tin alloy. An amount of application was set to 70 g/m². In order to make the added fluorine resin water repellent, the fluorine resin was subjected to a heat treatment in which it was heated in air at 380° C. for 60 minutes. Thus, a porous electrically conductive layer 31b having thickness H=300 μm and a porosity of 45% was formed on a surface of metal porous body 30 on which an electrode was to be stacked.

Sheet-shaped porous current collectors 26a and 27a including both of gas diffusion layer 21 and gas flow path 20 were formed by adjusting a thickness of metal porous body 30 composed of the nickel-tin alloy provided with electrically conductive layer 31, to which carbon particles 32 had been fixed with the fluorine resin, to a thickness of 650 μm with the use of a roller press. A portion of gas diffusion layer 21 formed from porous electrically conductive layer 31b in sheet-shaped porous current collectors 26a and 27a had a porosity of 40% and a portion of gas flow path 20 composed of the nickel-tin alloy had a porosity of 75%. The electrically conductive layer had thickness H of 200 μm.

A cell shown in FIG. 3 was obtained by cutting sheet-shaped porous current collectors 26a and 27a provided with electrically conductive layer 31 to which carbon particles 32 had been fixed into a size of 5×5 cm. A graphite plate was employed as current collection members (separator) 26b and 27b and four corners were fixed by fastening with bolts and nuts so that contact of each constituent material was improved and leakage of hydrogen and air from the cell was prevented. Since an actual fuel cell is formed by stacking a plurality of cells, the graphite plate of the separator had a thickness approximately from 1 to 1.5 mm. In the present Example, a fuel cell was obtained by adopting a graphite plate having a thickness of approximately 10 mm in order to achieve strength allowing resistance to fastening.

Comparative Example

For Comparative Example, a membrane electrode assembly the same as in Example 1 was adopted and a carbon sheet coated with fluorine was adopted as a gas diffusion layer, and they were stacked on the first electrode layer and the second electrode layer. A graphite plate (having a thickness of 20 mm) provided with grooves serving as a gas flow path was adopted as a separator. The grooves serving as the gas flow path had a depth of 1 mm and an interval between grooves was set to 1 mm. A ratio of grooves in the surface of the plate was set to 50%. A carbon sheet having a porosity of approximately 50% was adopted as the carbon sheet. A content of a fluorine resin used for a water repellent treatment of the carbon sheet was approximately 15%.

[Overview of Performance Test]

Discharge characteristics of the fuel cell according to Example 1 and Comparative Example were examined by supplying hydrogen to second electrode layer (fuel electrode) 24 and supplying air to the first electrode layer (air electrode). An apparatus in which supply of each gas was adjusted in accordance with a load was used. An ambient temperature was set to 25° C., a flow rate of hydrogen was set to 300 cc/minute, a flow rate of air was set to 1500 cc/minute, a humidifying temperature was set to 80° C., and a cell heating temperature was set to 80° C.

[Results of Test]

Figure 6:
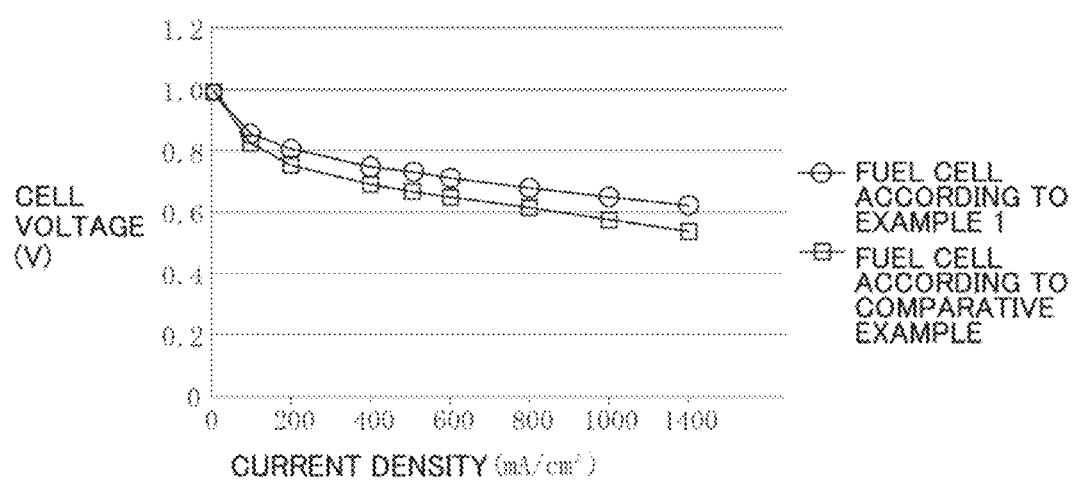
FIG. 6 is a diagram showing a result of a performance test of a fuel cell including the current collector according to Example 1 and a fuel cell including a current collector according to Comparative Example.

FIG. 6 shows current-voltage characteristics of each fuel cell according to Example 1 and a fuel cell according to Comparative Example. As is clear in FIG. 6, the fuel cell according to Example 1 was higher in cell voltage than the fuel cell according to Comparative Example in a discharge current region where a current density was not lower than 500 mA/cm$^2$.

In the fuel cell according to Example 1, gas flow path 20 is provided by the metal porous body (nickel-tin alloy). Therefore, electrical conduction performance of current collectors 28 and 29 in the fuel cell according to Example 1 is higher by approximately two orders of magnitude than graphite in the fuel cell according to Comparative Example. Since a porosity of gas flow path 20 in the fuel cell according to Example 1 is set to approximately 75%, it is higher than 50% which represents a ratio of a region where grooves are formed in the graphite plate of the fuel cell according to Comparative Example. Therefore, hydrogen and air are smoothly supplied to electrode layers 23 and 24 and escape of air or removal of generated water after discharging is also smooth. Consequently, it is concluded that the fuel cell according to Example 1 exhibited a voltage higher than the fuel cell according to Comparative Example in high density discharge.

As a result of continuous discharging for 3000 hours at a discharge current density of 750 mA/cm$^2$, there was no lowering in discharge voltage in the fuel cell according to Example 1, whereas lowering in discharge voltage by 5% occurred in the fuel cell according to Comparative Example. When discharging again at 750 mA/cm$^2$ was carried out after the fuel cell was left for 10 hours after suspension of discharging, the fuel cell according to Comparative Example also exhibited a voltage before lowering. This may be because supply of a gas to the electrode was blocked by water representing a product resulting from discharging, which partly remained in the grooves in the separator. Absence of lowering in voltage in the fuel cell according to Example 1 may be because Example 1 was higher in porosity of gas flow path 20 than the fuel cell according to Comparative Example, gas flow path 20 formed from the porous body unlike the grooves provided by mechanical working was provided and hence pores were uniformly present in the entire gas flow path, and a flow of the gas was not blocked by generated water which remained in the gas flow path.

Each fuel cell was disassembled for examination after evaluation of the discharge characteristics. In the fuel cell according to Comparative Example, a width portion of the groove entered carbon paper and reduced a cross-section of the gas flow path, which resulted in block of a flow of the gas. In the fuel cell according to Example 1, a portion functioning as a gas diffusion layer and a portion functioning as a gas flow path were both made of the metal porous body and hence no such phenomenon as narrowing of a gas flow path as in the fuel cell according to Comparative Example did not take place.

Example 2

A fuel cell according to Example 2 was fabricated and performance thereof was compared with performance of the fuel cell according to Comparative Example described in Example 1.

(Overall Construction of Apparatus)

An apparatus according to Example 2 is the same in overall construction as Example 1.

(Fabrication of Metal Porous Body)

In Example 2, a nonwoven fabric made of a resin was selected and plated with nickel. Sheet-shaped porous current collectors 26a and 27a were thus formed.

Polyolefin which had broadly been produced and been inexpensive was selected as a material for a nonwoven fabric made of a resin. Core-in-sheath composite fibers composed of fibers of which core component was formed of polypropylene (PP) and sheath component was formed of polyethylene (PE) were adopted for the nonwoven fabric, and a nonwoven fabric high in porosity was fabricated by setting a ratio between polypropylene and polyethylene to 4:6 and melting a portion of contact between fibers with polyethylene low in softening point. In Example 2, slurry was prepared by dispersing the fibers, and a fiber web was formed with common wet pulp molding. A nonwoven fabric having an area density of 50 g/m$^2$, a porosity of 80%, and a thickness of 1.5 mm was fabricated by subjecting the fiber web to a heat treatment with a dryer at 140° C. and fusing the sheath component of the core-in-sheath composite fibers. The nonwoven fabric had a porosity of approximately 50%.

In order to provide electrical conductivity to the nonwoven fabric, an electrically conductive layer was formed by attaching graphite powders to a sheet of the nonwoven fabric. Specifically, graphite was attached as being distributed onto a skeleton of the nonwoven fabric by using graphite powders of which main particle had a size from 5 to 10 μm and immersing the graphite powders in a water-based emulsion of a styrene acrylate based copolymer resin, followed by drying. Here, the electrically conductive layer was formed by immersing the nonwoven fabric in a solution in which 200 g of graphite powders were dispersed in 900 g of a 10-weight % emulsion, pulling up the nonwoven fabric, and thereafter drying the nonwoven fabric at 100° C.

The resultant nonwoven fabric was subjected to nickel electroplating by using a Watts bath. A plating bath mainly composed of 330 g/liter of nickel sulfate, 50 g/liter of nickel chloride, and 40 g/liter of boric acid was employed. Plating with nickel with a weight per unit area of 350 g/m$^2$ was carried out with this method. A porosity of a nickel porous body in a form of a nonwoven fabric having such a three-dimensional skeleton was approximately 80% similarly to the foamed nickel porous body according to Example 1.

In Example 2, unlike the resin foam according to Example 1, a fuel cell was obtained with the nonwoven fabric being left, with attention being paid to the fact that mechanical strength of a polyolefin-based nonwoven fabric was high. As in Example 1, a nickel porous body in a form of a nonwoven fabric from which fibers were removed by burning away the resin or the like by heating the porous body in a form of the nonwoven fabric plated with nickel in air at a high temperature and thereafter subjecting the porous body to a heat treatment in a hydrogen atmosphere for reduction and annealing of partially oxidized nickel can also be fabricated.

Figure 7:
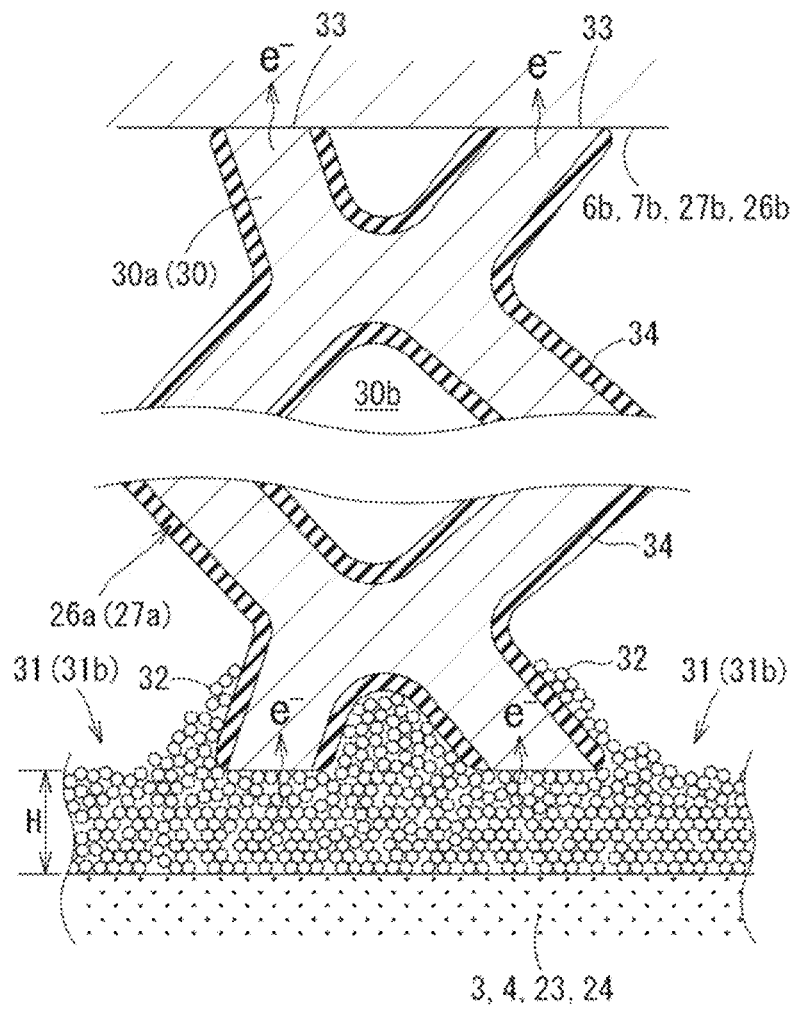
FIG. 7 is an enlarged cross-sectional view schematically showing a structure of a current collector according to Example 2.

In Example 1, the nickel porous body was alloyed in order to suppress corrosion by water generated in the polymer electrolyte fuel cell. In Example 2, alloying was not performed but resin layer 34 composed of a fluorine resin was formed on the entire metal skeleton in a form of a nonwoven fabric for improvement in corrosion resistance. As shown in FIG. 7, in Example 2, resin layer 34 was provided on the entire sheet-shaped porous current collectors 26a and 27a, and porous electrically conductive layer 31a to which carbon particles 32 which were electrically conductive particles had been fixed was formed on the side of the electrode layer.

In order to form resin layer 34, a commercially available 60-weight % fluorine resin (PTFE) dispersion was diluted to obtain a 12-weight % aqueous dispersion, into which a three-dimensional nickel porous body in a form of a nonwoven fabric was immersed. The porous body was then pulled up and dried at 90° C. Thereafter, the porous body was washed with water for removal of a surfactant in the dispersion and dried similarly at 90° C. Thereafter, the resin layer on the side of the electrode layer was removed by polishing.

Figure 8:
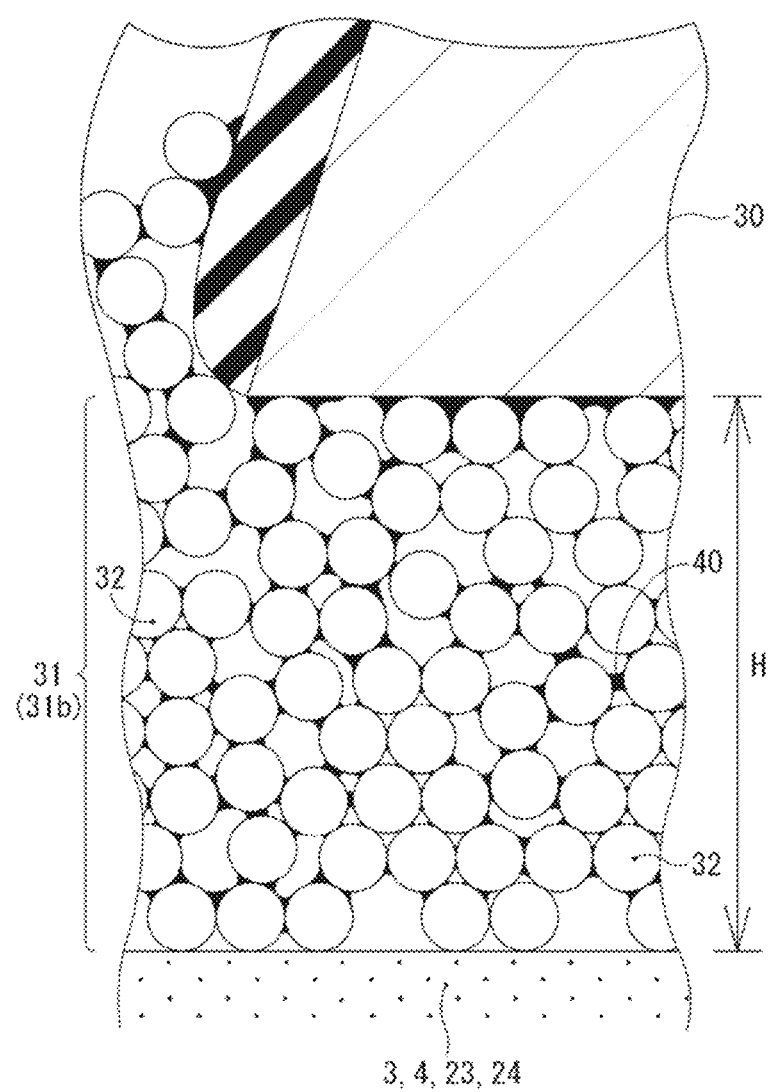
FIG. 8 is an enlarged view of a main portion of the current collector shown in FIG. 7.

Then, porous electrically conductive layer 31b to which carbon particles 32 had been fixed was formed on a surface in contact with the electrode layer, of nickel in a form of a nonwoven fabric provided with resin layer 34 composed of the fluorine resin, that is, the surface on the side of the electrode layer from which the resin layer had been removed. Graphite powders having a main particle size from 5 to 15 μm were employed as carbon particles 32. Slurry was prepared by adding an aqueous dispersion containing 10 weight % of a fluorine resin (PTFE) and carboxymethylcellulose (CMC) as a thickener to the graphite powders such that the fluorine resin was set to 7 weight % with respect to the graphite powders and adding a non-ionic surfactant to 1 weight % with respect to the entirety for improvement in dispersibility of graphite. The slurry was applied to a surface of the nickel porous body in a form of the nonwoven fabric, which was in contact with each of electrode layers 23 and 24. An amount of application was set to 70 g/m$^2$. In order to make resin layer 34 applied to the surface of the skeleton of the three-dimensional nickel porous body and electrically conductive layer 31 to which carbon particles 32 had been fixed water repellent, a heat treatment in air at 380° C. was performed for 30 minutes. As shown in FIG. 7, in the second embodiment, resin layer 34 was formed on the entire surface of metal porous body 30 except for the surfaces facing the electrode and the current collection member. In such a construction, a metal (nickel) forms the core portion and the resin layer forms the outer shell. The core portion may be formed of a nickel chromium based alloy, a nickel tin based alloy, or a nickel tungsten based alloy, in addition to nickel. As shown in FIG. 8, porous electrically conductive layer 31b is formed on the side of electrode layers 23 and 24 such that electrically conductive particles 32 are in contact with electrode layers 23 and 24. Porous electrically conductive layer 31 has a porous form in which resin 40 couples electrically conductive particles 32 to one another similarly to the electrically conductive layer according to Example 1, and porous electrically conductive layer 31b forms electrically conductive layer 31. In Example 2, resin layer 34 is formed to a thickness of 50 μm and porous electrically conductive layer 31b is formed to have H=100 to 150 μm.

With formation of resin layer 34 and electrically conductive layer 31 including porous electrically conductive layer 31b, a thickness of the nonwoven fabric was increased to approximately 1.6 mm. The thickness was adjusted to 700 μm with a roller press. After adjustment of a thickness, porous electrically conductive layer 31b to which carbon particles 32 had been fixed, with a portion which entered the skeleton of the nickel porous body being inclusive, had a thickness of approximately 50 μm, and a remaining thickness of 650 μm served as such a skeleton that resin layer 34 was provided on nickel porous body 30. A portion of sheet-shaped porous current collectors 26a and 27a provided with porous electrically conductive layer 31b had a porosity of approximately 35% and a skeleton central portion of the nickel porous body had a porosity of 75%. Then, polished surface 33 was provided by buffing the surface of the nickel porous body which was in contact with each of current collection members (separator) 26b and 27b.

The metal porous body composed of nickel in a form of the nonwoven fabric provided with electrically conductive layer 31 and resin layer 34 was cut into a size of 5×5 cm and a fuel cell was obtained by stacking the metal porous bodies as sheet-shaped porous current collectors 26a and 27a each including gas diffusion layer 21 and gas flow path 20 as shown in FIG. 3. The fuel cell was as in Example 1 in that four corners were fastened with bolts and nuts so that contact of each constituent material was improved and leakage of hydrogen and air from the cell was prevented.

[Overview of Performance Test]

Conditions for an evaluation apparatus or discharge characteristics were the same as the conditions in Example 1. Though an ambient temperature was set to 25° C., an operating temperature was set to 75° C.

[Results of Test]

Figure 9:
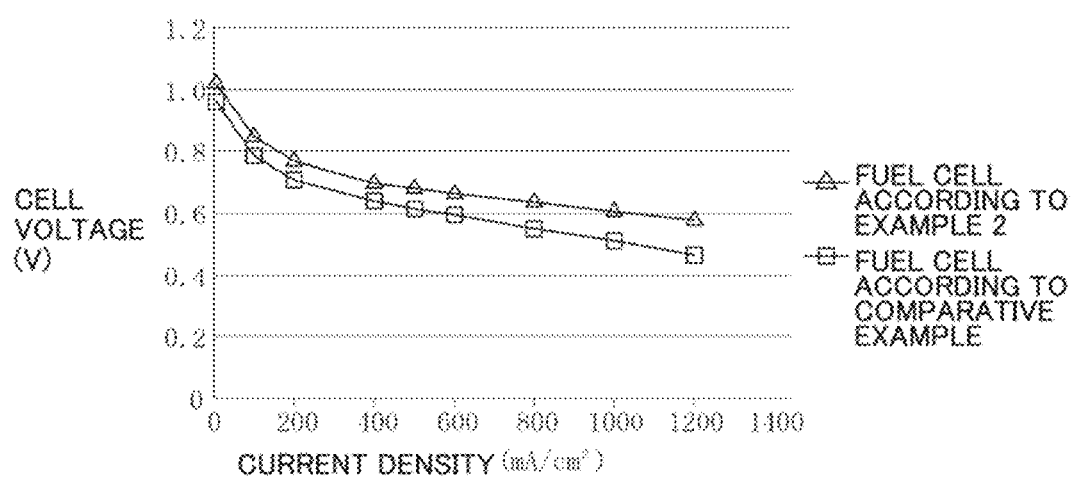
FIG. 9 is a diagram showing a result of a performance test of a fuel cell including the current collector according to Example 2 and the fuel cell including the current collector according to Comparative Example.

FIG. 9 shows current-voltage characteristics of the fuel cell according to Example 2 and the fuel cell according to Comparative Example. As is clear in FIG. 9, the fuel cell according to Example 2 was higher in cell voltage than the fuel cell according to Comparative Example in a discharge current region where a current density was not lower than 500 mA/cm$^2$.

In the fuel cell according to Example 2, as in Example 1, gas flow path 20 is provided by the nickel porous body and the fuel cell according to Example 2 is higher in electrical conductivity than the fuel cell according to Comparative Example in which the gas flow path was composed of carbon in its entirety. A porosity of the gas flow path was 70%, which is higher than 50% of the gas flow path provided by the grooves provided in the current collection member (separator) in the fuel cell according to Comparative Example. Therefore, it may be concluded that hydrogen and air were smoothly supplied to the electrode and exhaust of remaining air or water vapor after discharging was also smooth so that performance of the fuel cell according to Example 2 was enhanced.

As a result of continuous discharging for 5000 hours at a discharge current density of 750 mA/cm², there was no lowering in discharge voltage in the fuel cell according to Example 2, whereas lowering in discharge voltage by 7% as compared with the initial voltage occurred in the fuel cell according to Comparative Example. When discharging again at 750 mA/cm² was carried out after the fuel cell was left for 10 hours after suspension of discharging, the fuel cell according to Comparative Example also exhibited a voltage before lowering. This may be because supply of a gas to the electrode was blocked by water which was a product resulting from discharging and partly remained in the grooves in the current collection member (separator), similarly to Comparative Example in Example 1. Furthermore, it is assumed that an amount of remaining generated water was large and a degree of lowering in voltage was slightly high due to setting of the operating temperature in Example 2 lower than in Example 1. Absence of lowering in voltage in the fuel cell according to Example 2 may be because the gas flow path was higher in porosity than the fuel cell according to Comparative Example, pores were uniformly present in the entire gas flow path unlike the grooves provided by mechanical working, and hence generated water did not block a flow of the gas.

The fuel cell was disassembled for examination after evaluation of the discharge characteristics. In the fuel cell according to Comparative Example, a width portion of the groove of the current collector (separator) serving as the gas flow path entered the carbon sheet and blocked a flow of the gas. In the fuel cell according to Example 2, a portion serving as the gas diffusion layer and a portion serving as the gas flow path were both made of the metal porous body and hence a phenomenon as in Comparative Example did not take place.

The scope of the invention of the present application is not limited to the embodiments described above. It should be understood that the embodiments disclosed herein are illustrative and non-restrictive in every respect. The scope of the invention of the present application is defined by the terms of the claims, rather than the meaning described above, and is intended to include any modifications within the scope and meaning equivalent to the terms of the claims.

INDUSTRIAL APPLICABILITY

A current collector which allows manufacturing of a fuel cell high in electric power generation performance can be provided.

REFERENCE SIGNS LIST

2 solid polymer electrolyte layer; 3 first electrode layer (air electrode); 4 second electrode layer (fuel electrode); 5 membrane electrode assembly; 6a first gas diffusion sheet; 6b first current collection member; 8, 9 current collector; 7a second gas diffusion sheet; 7b second current collection member; 10 first gas flow path; 11 second gas flow path; 15 gasket; 16 gasket; 20 gas flow path; 21 gas diffusion layer; 25 membrane electrode assembly; 23 first electrode layer (air electrode); 24 second electrode layer (fuel electrode); 26a first sheet-shaped porous current collector; 26b current collection member (separator); 27a second sheet-shaped porous current collector; 27b current collection member (separator); 28 first current collector; 29 second current collector; 30 metal porous body; 30a skeleton; 30b pore; 31 electrically conductive layer; 31b porous electrically conductive layer; 32 electrically conductive particle (carbon particle); 33 polished surface; 34 resin layer; 34a corrosion-resistant and water-repellent resin; and 101, 201 fuel cell.

The invention claimed is:

1. A current collector for a fuel cell, the fuel cell including a membrane electrode assembly including a solid polymer electrolyte layer and a pair of electrode layers formed to sandwich the solid polymer electrolyte layer, a current collector stacked on each electrode layer, and a gas flow path for supply of a gas to each electrode layer, the current collector comprising:
   a metal porous body which is stacked on the electrode layer, has a flowing gas supplied to the electrode layer, and is rendered conducting to the electrode layer,
   an electrically conductive layer formed in the metal porous body and containing electrically conductive particles fixed to a corrosion-resistant and water-repellent resin, the electrically conductive layer forming a surface on a side of the metal porous body facing the electrode layer,
   wherein the electrically conductive layer is porous;
   the metal porous body provides a gas flow path which allows a gas to flow in a planar direction of the electrode layer; and
   a portion of the metal porous body other than the electrically conductive layer has a porosity from 50 to 85% and a pore diameter from 150 µm to 500 µm,
   the electrically conductive layer has a porosity from 30 to 50% and a pore diameter from 10 µm to 100 µm,
   the electrically conductive layer functions as a diffusion layer, and
   the metal porous body and the electrically conductive layer are inseparable.

2. The current collector for a fuel cell according to claim 1, comprising a resin layer formed of the corrosion-resistant and water-repellent resin on a part or entirety of the metal porous body.

3. The current collector for a fuel cell according to claim 1, wherein
   the corrosion-resistant and water-repellent resin includes a fluorine resin, and
   the electrically conductive particles are carbon powders.

4. The current collector for a fuel cell according to claim 1, wherein
   a polished surface is formed on a side of the metal porous body opposite to the electrode layer, and
   the current collector for a fuel cell comprises a current collection member connected to the polished surface.

5. The current collector for a fuel cell according to claim 1, wherein
   the metal porous body is formed of nickel, a nickel chromium based alloy, a nickel tin based alloy, or a nickel tungsten based alloy.

6. The current collector for a fuel cell according to claim 1, wherein
   the metal porous body includes a skeleton including an outer shell and a core portion and includes such a three-dimensional mesh structure that the skeleton is integrally continuous, and he core portion is formed of a hollow material, an electrically conductive material, or both of the hollow material and the electrically conductive material.

7. A fuel cell comprising the current collector for a fuel cell according to claim 1.

8. The current collector for a fuel cell according to claim 1, wherein
the metal porous body includes a metal skeleton having a three-dimensional mesh structure that is integrally continuous throughout the metal porous body.

* * * * *